United States Patent
Delecroix et al.

(10) Patent No.: US 12,316,540 B1
(45) Date of Patent: May 27, 2025

(54) PRIVATE MANAGEMENT OF MULTI-CLOUD OVERLAY NETWORK

(71) Applicant: AVIATRIX SYSTEMS, INC., Santa Clara, CA (US)

(72) Inventors: Nicolas Delecroix, Menlo Park, CA (US); Li Yan, Santa Clara, CA (US); Spencer Witkin, Santa Clara, CA (US); Saad Mirza, Murphy, TX (US)

(73) Assignee: Aviatrix Systems, Inc., Santa Clara, CA (US)

( * ) Notice: Subject to any disclaimer, the term of this patent is extended or adjusted under 35 U.S.C. 154(b) by 0 days.

(21) Appl. No.: 17/859,998

(22) Filed: Jul. 7, 2022

(51) Int. Cl.
  *H04L 12/66* (2006.01)
  *H04L 9/40* (2022.01)
  *H04L 41/044* (2022.01)
  *H04L 41/08* (2022.01)
  *H04L 43/08* (2022.01)
  *H04L 45/64* (2022.01)

(52) U.S. Cl.
  CPC .......... *H04L 45/64* (2013.01); *H04L 12/66* (2013.01); *H04L 41/044* (2013.01); *H04L 41/08* (2013.01); *H04L 43/08* (2013.01); *H04L 63/0272* (2013.01)

(58) Field of Classification Search
  CPC ....... H04L 45/64; H04L 41/044; H04L 41/08; H04L 43/08
  USPC ........................................................... 709/221
  See application file for complete search history.

(56) References Cited

U.S. PATENT DOCUMENTS

2016/0105392 A1* 4/2016 Thakkar ............. H04L 61/5061
709/220

* cited by examiner

*Primary Examiner* — Suraj M Joshi
(74) *Attorney, Agent, or Firm* — Winstead PC

(57) ABSTRACT

A multi-cloud overlay network for supporting communications between a first public cloud network and a second public cloud network. The overlay network features a management virtual private network, which includes a network load balancing (NLB) component and a controller registered as a target on a port of the NLB component. The overlay network further includes one or more spoke or transit gateways and a multi-cloud access virtual private cloud (VPC) operating within the first public cloud network, and a remote cloud load balancer component operating the second public cloud network. The remote cloud load balancer component is communicatively coupled between the multi-cloud access VPC and one or more remote spoke or transit gateways. The multi-cloud access VPC includes a VPC endpoint that is assigned a private IP address and communicatively coupled to the NLB component and a virtual private network (VPN) gateway communicatively coupled to a private transport.

14 Claims, 6 Drawing Sheets

PRIVATE MANAGEMENT OF MULTI-CLOUD OVERLAY NETWORK

CROSS-REFERENCE TO RELATED APPLICATIONS

This application claims the benefit of priority on U.S. Patent Application No. 63/257,021 filed Oct. 18, 2021, the entire contents of which are incorporated by reference herein.

FIELD

Embodiments of the disclosure relate to the field of networking. More specifically, one embodiment of the disclosure relates to a software-defined cloud overlay network that exclusively relies on private network addressing.

GENERAL BACKGROUND

Over the past few years, cloud computing has provided Infrastructure as a Service (IaaS), where components have been developed to leverage and control the native constructs for all types of public cloud networks, such as AMAZON® WEB SERVICES (AWS), MICROSOFT® AZURE® Cloud Services, GOOGLE® Cloud Services, or the like. These components operate as part of a cloud network infrastructure, which overlays portions of a public cloud network or multiple public cloud networks and provides enhanced functionality (e.g., enhanced security, increased visibility, etc.).

The overlaying network infrastructure may be configured to support hundreds of tenants (e.g., different departments or business units, organizations or other entities) concurrently by implementing virtual networking infrastructures, where the construct of these virtual networking infrastructures may vary depending on the public cloud provider. For example, the virtual networking infrastructures may include virtual private clouds for AMAZON® WEB SERVICES (AWS) or GOOGLE® CLOUD, virtual networks (VNets) for MICROSOFT® AZURE® Cloud Services, ORACLE® Virtual Cloud Network, or the like. For ease and consistency, we shall refer to all types of these virtual networking infrastructures as a "virtual private cloud network" or "VPC."

In general, a "VPC" is an on-demand, configurable pool of shared resources, where a certain type of VPC (hereinafter, "spoke VPC") may be used as an entry or exit point in the routing of messages within a public cloud network or multiple public cloud networks. For example, a spoke VPC may receive messages from resources within an on-premises network, resources within a different VPC, or resources within the spoke VPC itself. As part of the overlaying network infrastructure, the spoke VPC operates as an entry point for routing messages to another spoke VPC operating as an exit point for these messages for subsequent routing to a targeted resource.

Currently, the routing of the messages (e.g., control messages, management messages, and/or data messages) utilizes public network addresses, such as public Internet Protocol (IP) addresses. However, the use of public IP addresses poses compliance issues with customers. For example, the U.S. Federal government and other industries within the financial sector have begun to prohibit direct Internet access involving VPCs using public network addressing. For example, for many governmental and financial-based networks, no Internet gateway or network address translation (NAT) gateway is permitted. Instead, all Internet traffic is sent to on-premises (hereinafter, "on-prem") networks to be inspected by a deep security stack. Hence, cloud instances would need to rely on private IP addressing for communications. Additionally, for compliance requirements with the Health Information Trust Alliance (HITRUST), public IP addresses are not permitted for any instance or virtual machine (VM) unless that components goes through inspection (e.g., cyberthreat analytics, etc.).

Hence, conventional cloud-based architectures are subject to increased network complexity, increased cost, lesser throughput and scalability issues unless a multi-cloud overlay network relying on private IP addressing is developed.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
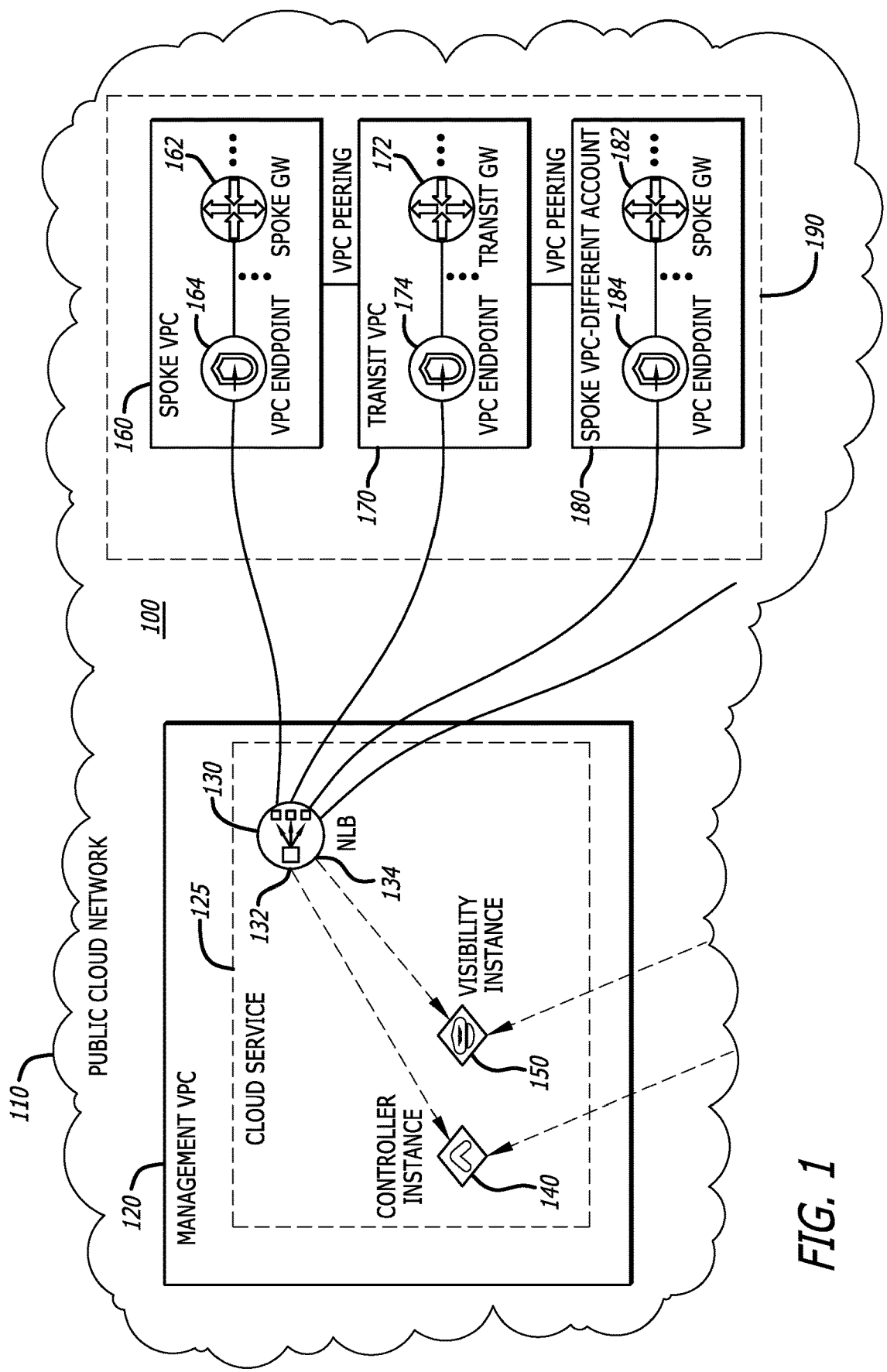
FIG. 1 is an exemplary embodiment of a multi-cloud overlay network corresponding to a software-defined cloud overlay network supporting different cloud accounts within a single public cloud network.

Embodiments of a software-defined multi-cloud (or cloud) overlay network that operates entirely using private network addressing is described. Herein, the multi-cloud overlay network features a management virtual networking infrastructure, a multi-cloud access virtual networking infrastructure, a remote load balancing virtual networking infrastructure, and a plurality of virtual networking infrastructures communicatively coupled to the management virtual networking infrastructure and the remote load balancing virtual networking infrastructure. A virtual networking infrastructure may include, but is not limited or restricted to a virtual private cloud, which may be deployed as part of AMAZON® WEB SERVICES (AWS) or GOOGLE® CLOUD, virtual networks (VNets) for MICROSOFT® AZURE® Cloud Services, ORACLE® Virtual Cloud Network, or the like. For ease and consistency, we shall refer to all types of these virtual networking infrastructures, independent of the cloud service provider, as a "virtual private cloud network" or "VPC."

More specifically, the multi-cloud overlay network may include at least the management VPC, one or more spoke VPCs, one or more transit VPCs, the multi-cloud access VPC, and the remote load balancing VPC. These VPCs are configured to receive control messages over a control plane that establishes communicative couplings between the VPCs, where each of the VPCs is associated with a unique private network address range and each cloud component in the VPCs is associated with a unique private network address. For example, each of the VPCs may be associated with a unique private Internet Protocol (IP) address range, with each cloud component within the VPCs (e.g., computing devices such as VPC endpoints, gateways, etc.) assigned a private IP address within that private IP address range.

Herein, a management VPC includes a multi-cloud controller instance (hereinafter, "controller") operating as a centralized component configured to provision and orchestrate all of the computing devices, which may be located within different VPCs residing in different public cloud networks and are accessible through private IP addresses. The management VPC may further include a multi-cloud visibility instance and a network load balancer (NLB) component. The multi-cloud visibility instance is configured to conduct network health monitoring and various analytics for report generation to the tenant administrator. The NLB component operates as a front-facing component for VPCs communicatively coupled to the controller, such as the multi-cloud access VPC as well as spoke VPCs and/or transit VPCs residing in multiple, different public cloud networks. The controller and the multi-cloud visibility instance (e.g., AVIATRIX® CoPilot™) are registered as targets on different ports of the NLB component.

A "spoke VPC" is a collection of computing devices, namely one or more spoke gateways responsible for routing network traffic between a component and a cloud-based service that may be available to multiple (two or more) tenants. For example, a "spoke gateway" is a computing device (e.g., software instance) that supports routing of network traffic between the component requesting the cloud-based service and a VPC that maintains the cloud-based service. Each spoke gateway has access to a gateway routing table, which identifies available routes for a transfer of data from the spoke gateway to a transit gateway deployed within a transit VPC or a spoke gateway deployed within another spoke VPC. Each spoke gateway has access to a VPC routing table, which includes addresses of virtual subnetworks (and components within the virtual subnetworks) to which the spoke gateway has access.

A "transit VPC" may be generally defined as a collection of computing devices, namely one or more transit gateways, which are responsible for furthering assisting in the propagation of network traffic (e.g., one or more messages) between different VPCs, such as between different spoke gateways within different spoke VPCs. Each transit gateway allows for the connection of multiple, geographically dispersed spoke VPCs as part of a control plane and a data plane.

A "multi-cloud access VPC" is a collection of computing devices, namely a VPC endpoint and a corresponding virtual private network (VPN) gateway for example, both assigned a unique private IP address and supporting communications over a private transmission medium between the NLB component operating in a first public cloud network and the remote load balancing VPC operating in a second public cloud network. Set-up by a network administrator, the private transmission medium may correspond to different private peerings that are communicatively coupled together.

The VPC endpoint may be configured to support a highly available, scalable private transport that supports connectivity between VPCs without usage of a public IP address and network address translation (NAT) devices for such connectivity. Examples of the private transport may include, but is not limited or restricted to AWS PrivateLink or Azure® Private Link.

A "remote load balancing VPC" is a collection of computing devices, such as a load balancer component, a proxy server, and/or a VPN gateway (e.g., virtual network gateway "VNG") communicatively coupled to the VPN gateway of the multi-cloud access VPC. Herein, the proxy server operates as a backend target for the VPC endpoint of the multi-cloud access VPC, where the proxy server occupies the same VPC as the load balancer component. The proxy server is associated with the load balancer component to register the proxy server as a target for the load balancer component which, similar to the NLB component, operates as a front-facing component for the remote spoke and/or transit VPCs.

According to one embodiment of the disclosure, the multi-cloud overlay network relies, sometimes solely, on private network addressing for communications over a control plane, which may span over two or more different public cloud networks. Herein, for this embodiment, a first orchestration phase of the multi-cloud overlay network creates a first portion of control plane that may be configured to utilize private network addressing over one or multiple regions of a first public cloud network local to the controller. A second orchestration phase of the multi-cloud overlay network expands the control plane to allow the controller within the first public cloud network to also control provisioning and configuration of components within a second public cloud network or other public cloud networks that are provided by a cloud service provider (CSP) different from the CSP of the first public cloud network. As illustrative examples, the multi-cloud overlay network may span over two or more public cloud networks such as AMAZON® WEB SERVICES (AWS) and MICROSOFT® AZURE® Cloud Services for example.

According to one embodiment of the disclosure, the first orchestration phase may involve a first set of workflow operations to establish control plane connectivity for the multi-cloud overlay network across the first public cloud network local to the controller. As a first workflow operation, the controller, a cloud instance configured by the tenant to control operations of the multi-cloud overlay network, is launched. Next, the controller is accessed to create a network load balancing (NLB) component, where the NLB component is assigned a private IP address. The creation may be accomplished automatically by processes conducted by the controller or by a tenant administrator based on graphic user interface (GUI) elements rendered for selection and entry of data to produce the NLB component. Lastly, the controller is registered as a target component of the NLB component. This creates a first communication link between the NLB component and the controller, and thus, the NLB component operates as a front-facing component for VPCs (e.g., spoke, transit and/or multi-cloud access VPCs) communicatively coupled to the controller.

Next, as a fourth workflow operation, one or more gateway VPCs are created for communication back to the NLB component. Such creation may be accomplished automatically by processes conducted by the controller or by a tenant administrator based on other GUI elements rendered for selection and entry of data to produce the NLB component. For example, according to one embodiment of the disclosure, a spoke VPC may be created, inclusive of one or more spoke gateways. These spoke gateway(s) are configured to support routing of network traffic between a software instance requesting a cloud-based service and entering the multi-cloud overlay network via the spoke gateway(s). Similarly, a transit VPC may be created, inclusive of one or more transit gateway. The transit gateway(s) are configured to support routing of network traffic between different spoke VPCs.

After or during creation of the spoke gateway(s) and/or transit gateway(s), as a fifth workflow operation, a VPC endpoint is created and assigned a private IP address. Thereafter, as a sixth workflow operation, the VPC endpoint is communicatively coupled to the NLB component to create a communication path with the NLB component as well as establish communication paths with the spoke gateway(s) and/or transit gateway(s). The VPC endpoint is configured to route egress communications and receive ingress communications for each of the spoke gateway(s) within the spoke VPC and/or each of the transit gateway(s) within the transit VPC. As a result, as a seventh workflow operation, connectivity information (e.g., address, address pointer, etc.) is passed to each of the spoke and/or transit gateway(s) during launch to communicatively couple the spoke and/or transit gateway(s) to the NLB component, where the connectivity information is maintained in a data store accessible by the spoke and/or transit gateway(s).

According to one embodiment of the disclosure, the second orchestration phase may involve a second set of workflow operations to establish connectivity over the control plane between at least the first and second public cloud networks of the multi-cloud overlay network. As a first subset of workflow operations, the multi-cloud access VPC is created, which involves creation of a VPC endpoint specific to facilitate cross-cloud communications through the private transmission medium. This subset of workflow operations establishes communications between the VPC endpoint of the multi-cloud access VPC and the NLB component.

Thereafter or concurrent with the first subset of workflow operations, a second subset of workflow operations is performed to provision and configure the remote load balancing VPC. This provisioning and configuration includes launching a load balancer component operating within the second public cloud network. Where the second public cloud network corresponds to a MICROSOFT® AZURE® cloud network, as described below for illustrative purposes, a proxy server is launched and configured as well. The proxy server operates as a target for the VPC endpoint of the multi-cloud access VPC, where the proxy server occupies the same VPC as the load balancer component. The proxy server is associated with the load balancer component to register the proxy server as a target for the load balancer component.

Now, after the connectivity between the multi-cloud access VPC and the remote load balancing VPC has been established, a third subset of workflow operations are conducted to establish communications with the remote gateway VPCs associated with the second public cloud network and the load balancer component, which effectively establishes communications between these remote gateway VPCs and the controller.

According to one embodiment of the disclosure, one or more remote gateway VPCs are created for communication back to the load balancer component. For example, according to one embodiment of the disclosure, a remote spoke VPC is created including one or more remote spoke gateways and/or a remote transit VPC may be created, including one or more transit gateways. After or during creation of the remote spoke gateway(s), a remote VPC endpoint is created and assigned a private IP address to operate as a connection point with the load balancer component and create a communication path between the spoke gateway(s) of the remote spoke VPC of the second public cloud network to the controller via the remote VPC endpoint, the load balancer component, the proxy server, the VPC endpoint of the multi-cloud access VPC over private transports via the private transmission medium, and the NLB component.

I. Terminology

In the following description, certain terminology is used to describe features of the invention. In certain situations, each of the terms "component" and "logic" is representative of hardware, software, or a combination thereof, which is configured to perform one or more functions. As hardware, the component (or logic) may include circuitry having data processing and/or storage functionality. Examples of such circuitry may include, but are not limited or restricted to a processor (e.g., microprocessor, one or more processor cores, a programmable gate array, a microcontroller, an application specific integrated circuit, etc.); non-transitory storage medium; a superconductor-based circuit, combinatorial circuit elements that collectively perform a specific function or functions, or the like.

Alternatively, or in combination with the hardware circuitry described above, the component (or logic) may be software in the form of one or more software modules. The software module(s) may be configured to operate as one or more software instances with selected functionality (e.g., virtual processor, data analytics, etc.) or as a virtual network device including one or more virtual hardware components. The software module(s) may include, but are not limited or restricted to an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical, or other form of propagated signals such as carrier waves, infrared signals, or digital signals). Examples of non-transitory storage medium may include, but are not limited or restricted to a programmable circuit; a superconductor or semiconductor memory; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device.

One type of component may be a cloud component, namely a component that operates as part of a multi-cloud overlay network as described below. Cloud components are configured to control message routing between other components deployed within one or more public cloud networks. These other components may operate as part of a native cloud infrastructure of a public cloud network and may be specifically referred to as "native cloud components."

Controller: A "controller" is generally defined as a component that provisions and manages operability of cloud components within a one or more regions of a single public cloud network or within the multi-cloud network spanning two or more public cloud networks. This management may include leveraging intelligence (e.g., addresses, attributes such as assigned tags, etc.) acquired from components communicatively coupled to gateways forming a portion of an overlay network whose operability is controlled by the controller. According to one embodiment, the controller may be a software instance executed by a processor to provision and manage a multi-cloud overlay network for a tenant, where the multi-cloud overlay network assists in communications between different public cloud networks. The provisioning and managing of the multi-cloud overlay network is conducted to manage network traffic, including the transmission of data, between components within different public cloud networks.

Tenant: Each "tenant" uniquely corresponds to a particular customer provided access to the cloud or multi-cloud network, such as a company, individual, partnership, or any group of entities (e.g., individual(s) and/or business(es)).

Computing device: A "computing device" is generally defined as virtual or physical logic with data processing and/or data storage functionality. Herein, a computing device may include a software instance operating as a virtual device configured to perform functions based on information received from cloud components. For example, the computing device may correspond to a virtual server configured to execute software instances. The computing device may correspond to a virtual routing device that is responsible for controlling communications between different resources, such as a gateway for example.

Gateway: A "gateway" is generally defined as virtual or physical logic with data monitoring or data routing functionality. As an illustrative example, a first type of gateway may correspond to virtual logic, such as a data routing software component that is assigned an Internet Protocol (IP) address within an IP address range associated with a virtual networking infrastructure (VPC) including the gateway, to handle the routing of messages within and from the VPC. Herein, the first type of gateway may be identified differently based on its location/operability within a public cloud network, albeit the logical architecture is similar.

For example, a "spoke" gateway is a gateway that supports routing of network traffic between a component requesting a cloud-based service and a VPC that maintains the cloud-based service available to multiple (two or more) tenants. A "transit" gateway is a gateway configured to further assist in the propagation of network traffic (e.g., one or more messages) between different VPCs such as different spoke gateways within different spoke VPCs. Alternatively, in some embodiments, the gateway may correspond to physical logic, such as a type of computing device that is addressable (e.g., assigned a network address such as an IP address).

Region: Each "region" is an independent geographic area that allows users to host their resources. Since regions are independent geographic areas, spreading your resources (e.g., application instances, virtual machine instances, etc.) across different regions provides isolation from resource failures caused by software errors or corruption as well as hardware, software or other infrastructure failures. This provides system failure protection, given resource independence provided by the different regions.

VPC endpoint: A "VPC endpoint" or "endpoint" is generally defined as a computing device acting as a termination point for a private transmission medium between VPCs relying on private IP addresses.

Transmission Medium: A "transmission medium" is generally defined as a physical or logical communication link (or path) between two or more components. For instance, as a physical communication link, wired and/or wireless interconnects in the form of electrical wiring, optical fiber, cable, bus trace, or a wireless channel using infrared, radio frequency (RF), may be used. As a logical communication link, AWS Direct Connect, Azure® ExpressRoute, an API or a function call may be used to communicatively couple two or more components together.

Computerized: This term and other representations generally represents that any corresponding operations are conducted by hardware in combination with software.

Create: The term "create" along with other tenses for this term generally represents generation of a component, such as a virtual private cloud network or a computing device residing within the virtual private cloud network, which may be conducted automatically through machine learning or other artificial intelligence (AI) logic or may be conducted manually based on input of data or selection of data elements (e.g., pull-down menu items, trigger switch setting, etc.) rendered as part of a GUI display element accessible by a tenant administrator.

Message: Information in a prescribed format and transmitted in accordance with a suitable delivery protocol. Hence, each message may be in the form of one or more packets (e.g., data plane packets, control plane packets, etc.), frames, or any other series of bits having the prescribed format.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Multi-Cloud Overlay Network Architecture/Single Cloud Network

Referring now to FIG. 1, an exemplary embodiment of a software-defined multi-cloud overlay network (referred to as "multi-cloud overlay network") 100, which runs entirely on private network addressing (e.g., Internet Protocol "IP" addresses) and supports different cloud accounts within a single public cloud network 110, is shown. Herein, for this embodiment, a management VPC 120 is configured with a cloud service 125 supported by a network load balancing (NLB) component 130, a multi-cloud controller instance (hereinafter, "controller") 140, and a multi-cloud visibility instance 150. The controller 140 is a component that provisions and manages operability of other components within the multi-cloud overlay network 100, such as spoke gateways 162/182, transit gateways 172, or the like. The multi-cloud visibility instance 150 is a component that monitors network traffic through the public cloud network 110 of a multi-cloud network as well as the multi-cloud overlay network 100 for network health monitoring and conducts analytics and intrusion detection operations on the network traffic to identify trends and/or anomalies, filter traffic, apply tags to resources of the multi-cloud network, and/or generate alerts/reports directed to the tenant (or a tenant administrator).

Each of these components 130, 140 and 150 is assigned a unique private network address and the NLB component 130 is configured so that both instances, namely the multi-cloud controller instance 140 and the multi-cloud visibility instance 150, are registered as targets on different ports 132 and 134 of the NLB component 130. Shown as being deployed within the same region as the management VPC 120, a first spoke VPC 160 including one or more spoke gateways 162, a transit VPC 170 including one or more transit gateways 172, and/or a second spoke VPC 180 including one or more spoke gateways 182 form an intra-region portion 190 of the multi-cloud overlay network 100. Each of the spoke VPCs (e.g., spoke VPCs 160/180) and transit VPCs (e.g., transit VPC 170) include a VPC endpoint 164/184 and 174, which is configured for communicative coupling with the NLB component 130 to allow for private communications between the gateways 162/172/182 and components within the management VPC 120 such as the controller 140. The NLB component 130 and VPC endpoint 164/174/184 connectivity allows the spoke VPCs and transit VPCs, such as spoke VPCs 160 and 180 for example, to be associated with different cloud accounts.

Figure 2:
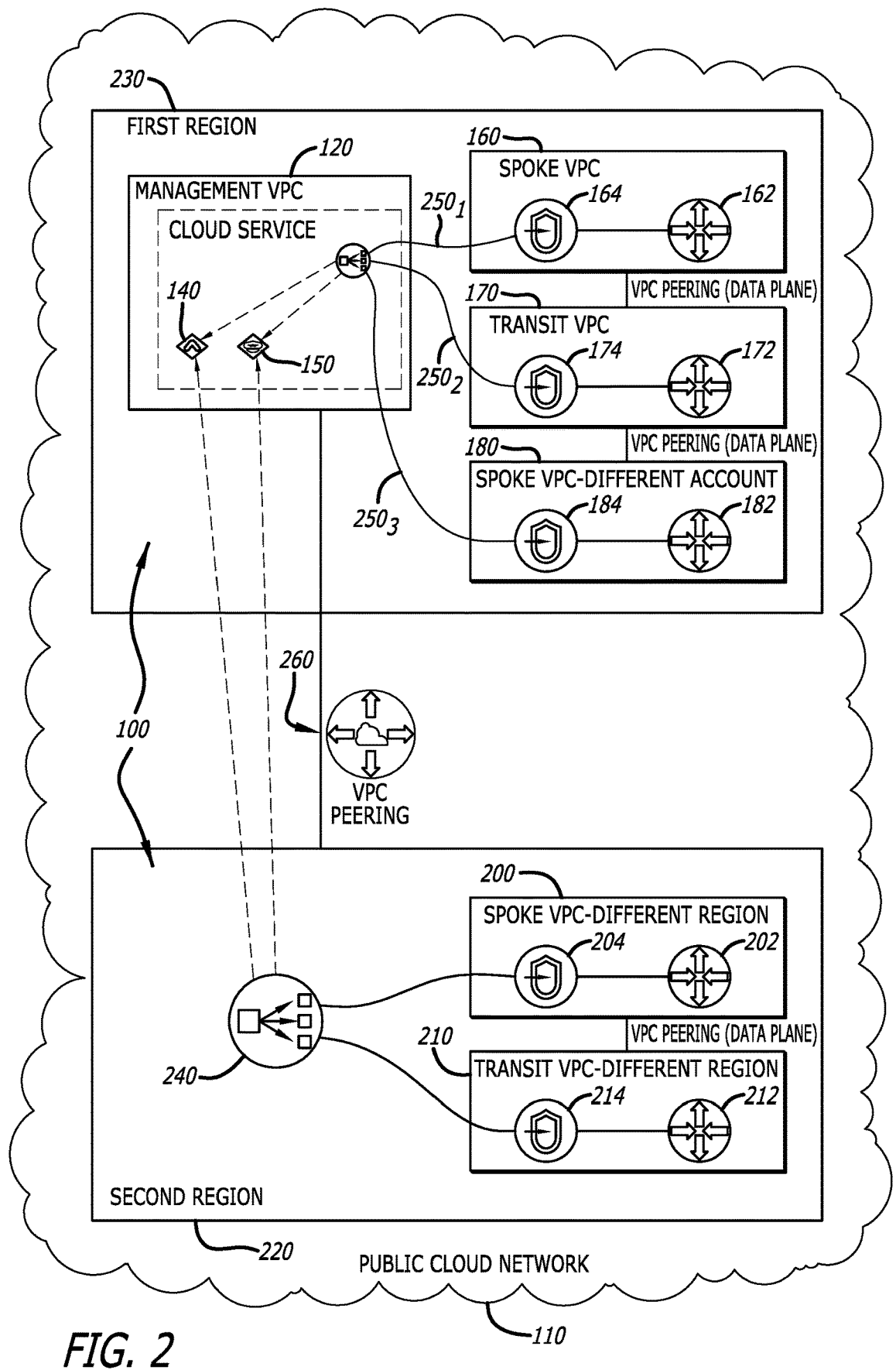
FIG. 2 is an exemplary embodiment of the multi-cloud overlay network of FIG. 1 supporting inter-region communications within a single public cloud network.

Referring now FIG. 2, an exemplary embodiment of a portion of the multi-cloud overlay network 100 of FIG. 1, which supports inter-region communications within the public cloud network 110, is shown. Herein, one or more spoke VPCs (hereinafter, "spoke VPC(s)") 200 and/or transit VPC (s) 210 associated with the multi-cloud overlay network 100 are located in a second region 220 that is different from a first region 230 in which the management VPC 120 is located. Hence, the multi-cloud overlay network 100 operates as an inter-region network overlay.

As shown, according to one embodiment of the disclosure, located in the second region 220, the spoke VPC(s) 200 is equipped with networking gateways such as spoke gateway(s) 202. Similarly, the transit VPC(s) 210 is equipped with transit gateway(s) 212. Herein, VPC endpoints 204 and 214 are created in those spoke and transit VPC(s) 200 and 210, respectively. The VPC endpoints 204 and 214 are configured for communicative coupling with a dedicated, regional load balancer component 240, local to the second region 220. The regional load balancer component 240 is configured to communicate back to the management VPC 120 within the first region 230.

As shown in both FIGS. 1-2, the VPC endpoints 164/174/184 are coupled to the NLB component 130 via corresponding private transport links 2501-250N (e.g., N≥1) such as AWS™ PrivateLink or Azure® Private Link. Herein, each private transport link 2501-250N, such as private transport links 2501-2503 for example, inherently has the limitation that communications can only be initiated by computing devices configured to consume network traffic (e.g., networking gateways such as spoke gateways 162/182 and transit gateway 172). This conventional, restrictive link design is problematic as the controller 140 cannot send commands/configuration to any of the gateway 162, 172, 182, 202 and/or 212 to initiate a TCP connection to that gateway. To solve this problem, each of the gateways 162, 172, 182, 202 and/or 212 is configured, during launch, to initiate a connection to the controller 140 through the VPC endpoints 164, 174, 184, 204 and/or 214, respectively. Thereafter, the controller 140 may send any commands or configuration to a connected gateway 162, 172, 182, 202 and/or 212 over the control plane of the multi-cloud overlay network 100, which runs on top of the TCP connection initiated from the connected gateway. Hence, multi-cloud overlay network 100 is a software based overlay that is configured to facilitate 2-way communications initiated from either the controller 140 or a gateway (e.g., gateway 162) on top of the original TCP connection made from the gateway 162.

The regional load balancer component 240 is configured with the multi-cloud controller 140 and the multi-cloud visibility instance 150 as its targets (communicative couplings). A communication peering 260 via native cloud components exists between the regional load balancer component 240 and the NLB component 130 in order to expand a control and/or management plane of the multi-cloud overlay network 100 to allow for inter-region control and interaction with the networking gateways within the spoke VPC(s) 200 and transit VPC(s) 210.

Figure 3:
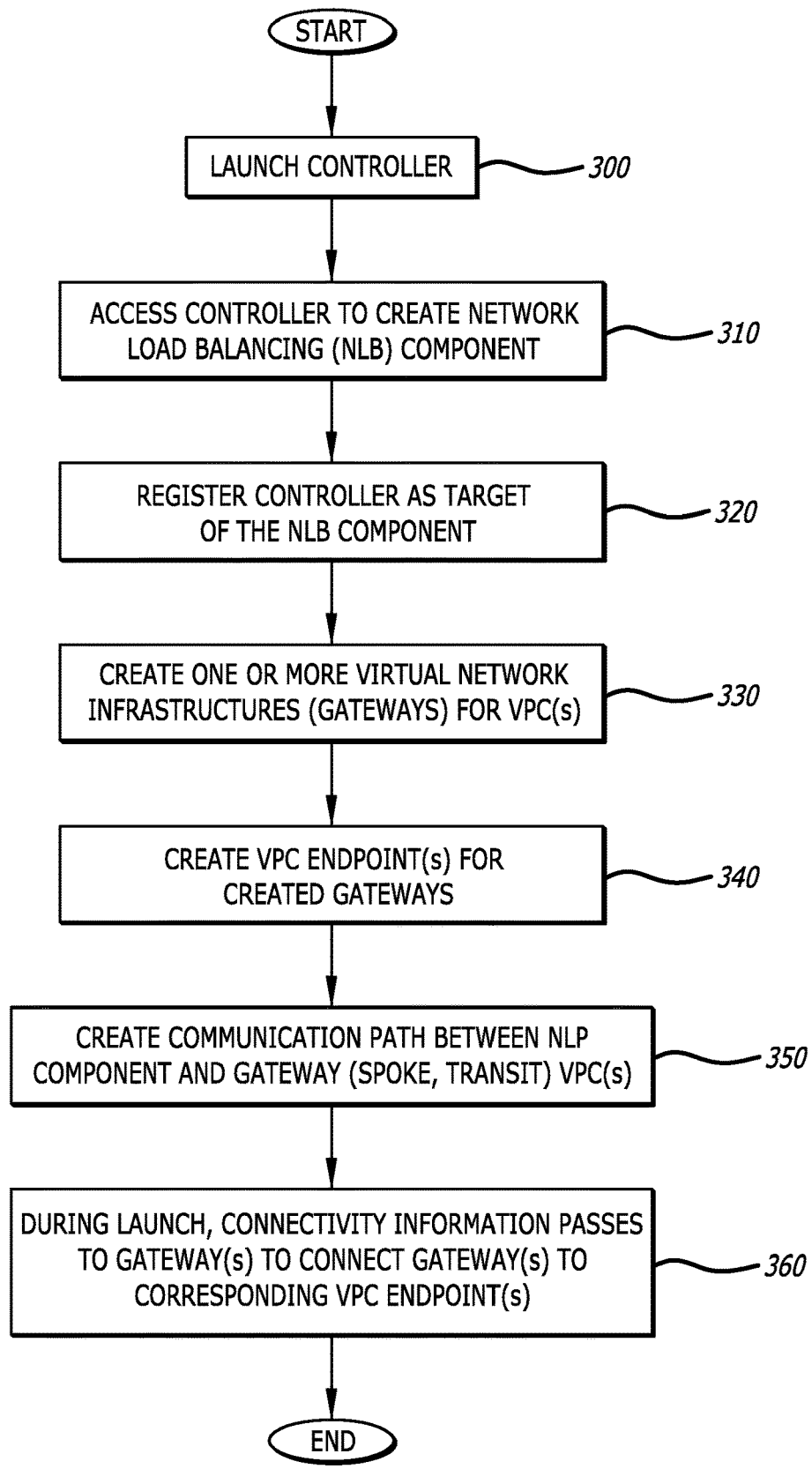
FIG. 3 is an exemplary embodiment of operations for configuration of the multi-cloud overlay network of FIG. 1 or FIG. 2.

Referring now to FIGS. 1-3, an exemplary embodiment of operations for a first orchestration phase in a configuration of the multi-cloud overlay network 100 of FIG. 1 or FIG. 2 is shown. Herein, according to the first orchestration phase, a control plane of the multi-cloud overlay network 100 that spans across different regions of a first public cloud network of which the multi-cloud overlay network 100 relies solely on private network addressing for communications and extends across two or more different public cloud networks is described. For this illustrative example of the configuration of the multi-cloud overlay network 100, the multi-cloud overlay network may span over two or more public cloud networks such as AMAZON® WEB SERVICES (AWS) and MICROSOFT® AZURE® Cloud Services for example.

In general, with respect to deployment, the controller 140 and the multi-cloud visibility instance 150 are first deployed by the user. The cloud accounts are on-boarded with the necessary permissions for the private transport link 2501-250N. On the controller 140, when a "private mode" operating state of the multi-cloud overlay network 100 is enabled, the controller 140 is triggered to automatically deploy and configure the NLB component 130 in its management VPC 120. The controller 140 registers itself and the multi-cloud visibility instance 150 as targets to the NLB component 130.

Hence, every time a spoke VPC or transit VPC is deployed intra-region (i.e., within the same region as the controller 140), the controller 140 automatically creates a VPC endpoint in that VPC. The VPC endpoint connects back to the NLB component 130 via the private transport link 250. The controller 140 also programs VPC route tables with the appropriate route entries to direct the management and control plane traffic to the VPC endpoint. Finally, the controller 140 brings up a Secure Socket Layer (SSL) Virtual Private Network (VPN) overlay for UDP between the gateways and the visibility platform. (e.g., multi-cloud visibility instance 150).

When a spoke or transit VPC is deployed in another account of the same region, the controller 140 follows the same operations described above, with an addition operation of handling the multi-account approval process for connectivity of the private transport link 2501 . . . or 250N.

When a spoke VPC or transit VPC is deployed inter-region (i.e., within a different region than the controller 140), the controller 140 automatically creates a VPC for the regional load balancer component 240, sets up the VPC peering to the management VPC 120, installs the regional load balancer component 240, and registers itself and the multi-cloud visibility instance 150 as targets. The VPC endpoint deployment process in the spoke or transit VPCs are then similarly automated as in the intra-region scenario described above.

More specifically, according to one embodiment of the disclosure and as shown in FIGS. 1-3, the first orchestration phase may involve a first set of workflow operations to establish connectivity over the control plane of the multi-cloud overlay network 100 within the first public cloud network 110. As a first workflow operation, the controller 140 (initially configured by the tenant to control operations of the multi-cloud overlay network 100) is launched (operation 300). As a second workflow operation, the controller is accessed to create a network load balancing (NLB) component, where the NLB component is assigned a private IP address (operation block 310). As a third workflow operation, the controller 140 is registered as a target component of the NLB component 130 (operation 320). This creates a first communication link between the NLB component 130 and the controller 140, and thus, the NLB component 130 operates as a front-facing component for VPCs communicatively coupled to the controller 140.

Next, as a fourth workflow operation, one or more VPCs are created for communication back to the NLB component 130 (operation 330). For example, according to one embodiment of the disclosure, a spoke VPC (e.g., spoke VPC 160) may be created in which the spoke VPC 160 includes one or more spoke gateways 162 of FIG. 1. These spoke gateway(s) 162 is configured to support routing of network traffic between a software instance requesting a cloud-based service and entering the multi-cloud overlay network 100 via the spoke gateway(s) 162.

After or during creation of the spoke gateway(s) 162, as a fifth workflow operation, a VPC endpoint 164 is created and assigned a private IP address (operation 340). Thereafter, as a sixth workflow operation, the VPC endpoint 164 is communicatively coupled to the NLB component 130 to create a communication path with the NLB component 130 and establish routing communications from the spoke gateway(s) 162 to the NLB component 130 (operation 350). The VPC endpoint 164 is configured to route egress communications from and receive ingress communications for each of the networking gateway(s) within the spoke and/or transit VPC(s). As a result, as a seventh workflow operation, connectivity information (e.g., address, address pointer, etc.) is passed into each of the networking gateway(s) during launch to communicatively couple the networking gateway(s) to the NLB component 130, where the connectivity information is maintained (operation 360).

III. Multi-Cloud Overlay Network Architecture/Multi-Cloud Network

Figure 4:
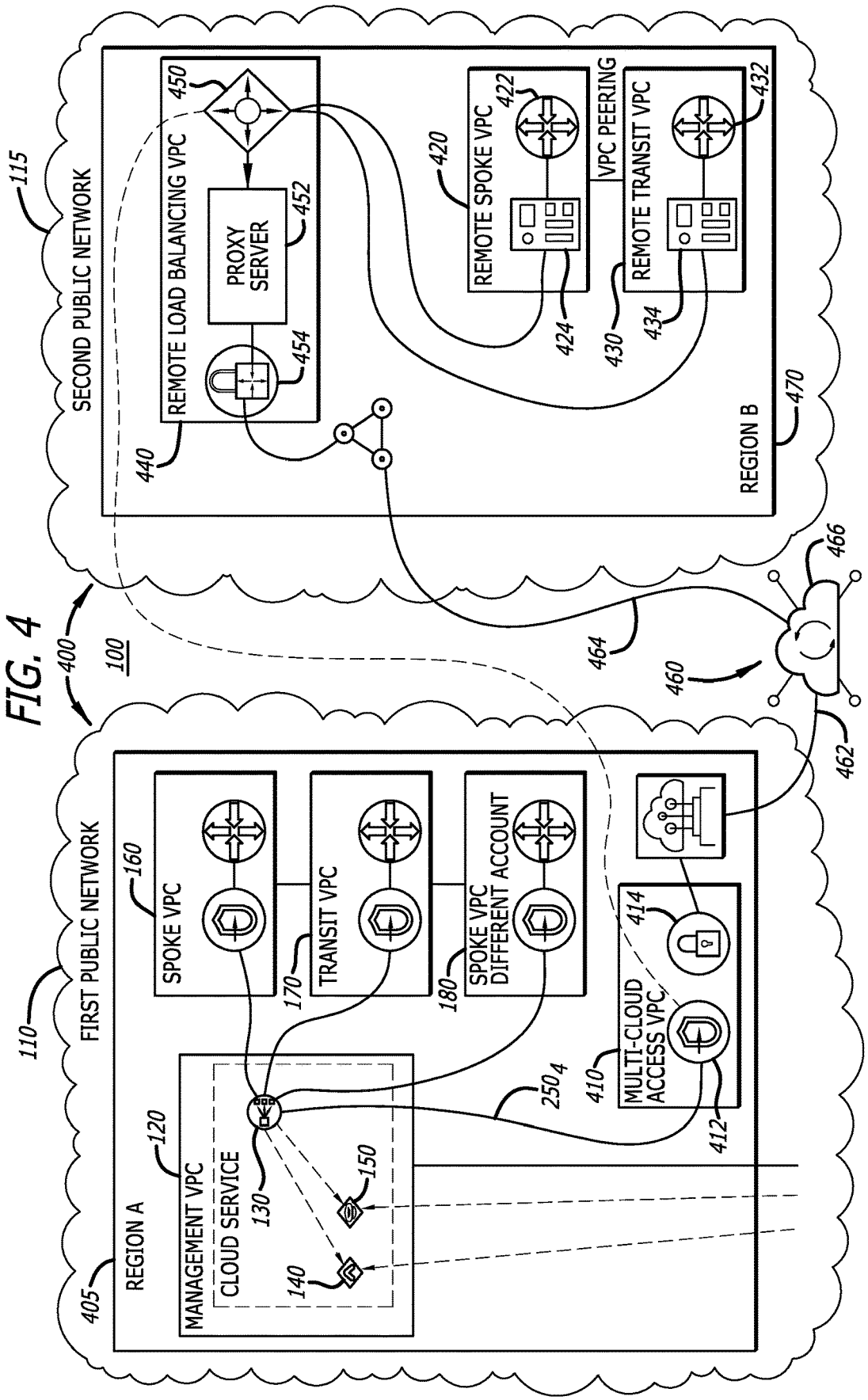
FIG. 4 is an exemplary embodiment of a multi-cloud overlay network corresponding to a software-defined multi-cloud overlay network supporting control plane connectivity over multiple public cloud networks with a controller residing within a first public cloud network of a first public cloud network type.

Referring now to FIG. 4, an exemplary embodiment of the multi-cloud overlay network 100 supporting overlay control plane connectivity with VPCs located within a multi-cloud network 400 (e.g., the first public cloud network 110 and a second public cloud network 115) is shown. This control plane connectivity is configured to provide a network architecture that supports private network addressing between different public cloud networks.

In general, within a region 405 of the first public cloud network 110 including the management VPC 120, a dedicated multi-cloud access VPC 410 includes a VPC endpoint 412 and a virtual private network (VPN) gateway 414. The VPC endpoint 412 is connected to the NLB component 130 (e.g., management load balancer) via a private transport link 2504.

Herein, each spoke and/or transit VPC deployed in different cloud networks than the first public cloud network 110 including the management VPC 120, referred to as remote spoke VPC 420 and/or remote transit VPC 430, is equipped with networking gateways. In particular, remote spoke VPC 420 is configured with one or more remote spoke gateways 422 while remote transit VPC 430 is configured with one or more transit gateways 432. The spoke gateways 422 and/or transit gateways 432 operate as part of an inter-cloud, multi-cloud overlay network 100.

Private endpoints 424 and 434, operating similar to the VPC endpoint 412, are created and uniquely assigned a private IP address in remote spoke VPC 420 and remote transit 430, and thereafter, are communicatively coupled to a remote load balancing VPC 440. The remote load balancing VPC 440 includes a dedicated, remote cloud load balancer component 450 local to a cloud region occupied by the remote spoke VPC 420 and/or remote transit VPC 430. Just like the inter-region case, a purpose of the private endpoints 424 and 434 is to communicate back to the management VPC 120 residing in a different public cloud network than the second public cloud network 115 in which the VPCs 420 and 430 reside. The VPC endpoint 412 of the multi-cloud access VPC 410, situated in the first public cloud network 110 in which the management VPC 120 resides, operates as a target for the load balancer component 450.

A private transport 460 is built on a private transmission mediums, such as AWS® Direct Connect 462 and Azure® ExpressRoute 464 for example. These private transmission mediums 462 and 464 are connected to each other by meeting in a colocation facility 466. In some public cloud networks, such as the second public cloud network 115, a proxy server 452 may be used in the remote load balancing VPC 440 inclusive of the load balancer component 450, in order to reach a target that is in a different cloud network when the load balancer component 450 cannot register targets outside of the second public cloud network 115.

The controller 140 does not manage the private transmission mediums 462 and 464. The private transmission mediums 462 and 464 are deployed by the tenant separately. However, when the spoke VPC 420 or transit VPC 430 is deployed in the second public cloud network 115 different than the first public cloud network 110 with the controller 140, the controller 140 automatically creates the multi-cloud access VPC 410 in its local region. During or subsequent to creation of the multi-cloud access VPC, the VPC endpoint 412 establishes a logical communication link back to the NLB component 130. The tenant may be responsible for connecting the private transmission medium 462 to the VPN gateway 414 of the multi-cloud access VPC 410 and the private transmission medium 464 to a virtual network gateway 454 of the remote load balancing VPC 440.

In the second (remote) public cloud network, the controller 140 creates the remote load balancing VPC 440, deploys the proxy server 452 if needed, and registers itself and the multi-cloud visibility instance 150 as targets (or register the proxy server 452 if a proxy is needed). The VPC endpoint deployment process in the spoke or transit VPCs are then similarly automated as described above pertaining to the communicative couplings established between the VPCs 160/170/180 and the NLB component 130.

More specifically, as shown in FIG. 4, an exemplary embodiment of multi-cloud overlay network 100 that overlays the multi-cloud network 400 and runs entirely on private network addressing (e.g., private IP addresses) is shown. Herein, for this embodiment, the management VPC 120 is configured to include the NLB component 130, the controller 140, and the multi-cloud visibility instance 150. Each of these components 130, 140 and 150 is assigned a unique private IP address and the NLB component 130 is configured so that both instances, namely the multi-cloud controller instance 140 and the multi-cloud visibility instance 150, are registered as targets on different ports 132 and 134 of the NLB component 130.

As shown in FIG. 4, besides the first spoke VPC 160 with one or more spoke gateways 162 and the transit VPC 170 with one or more transit gateways 172, the multi-cloud access VPC 410 is provided to enable cross-cloud communications through the private transport 460. Configured by a tenant administrator, the first private transmission medium 462 is communicatively coupled to the VPN gateway 414, which is communicatively coupled to the VPC endpoint 412, which is communicatively coupled to both the NLB component 130 (e.g., management load balancer) within the first public cloud network 110 and the load balancer component 450 within the remote load balancing VPC 440 of the second public cloud network 115. One subset of workflow operations (illustrated in FIG. 5) establishes communications between the VPC endpoint 412 of the multi-cloud access VPC 410 and the NLB component 130 while another subset of workflow operations establishes communications between the VPC endpoint 412 and the load balancer component 450.

It is contemplated that the second public cloud network 115 features the remote load balancing VPC 440 including the proxy server 452 and the load balancer component 450. Herein, the proxy server 452 provides the VPC endpoint 412, operating within the first public cloud network 110, with a private network address target in the second public cloud network 115 if the load balancer component 450 cannot register targets outside of the second public cloud network 115.

Shown as being deployed within the same region 470 as the remote load balancing VPC 440, one or more networking VPC, such as the remote spoke VPC 420 and the remote transit VPC 430, may be communicatively coupled to the load balancer component 450. Herein, the remote spoke VPC 420 features one or more spoke gateways 432 and the remote transit VPC 430 features one or more transit gateways 432. Each of the gateway VPCs (e.g., spoke VPCs 420 and transit VPC 430) include a VPC endpoint 424 and 434, both of which are configured for communicative coupling with the load balancer component 450 to allow for private communications between the gateways 422 and/or 432 and components within the management VPC 120 such as the controller 140.

Figure 5:
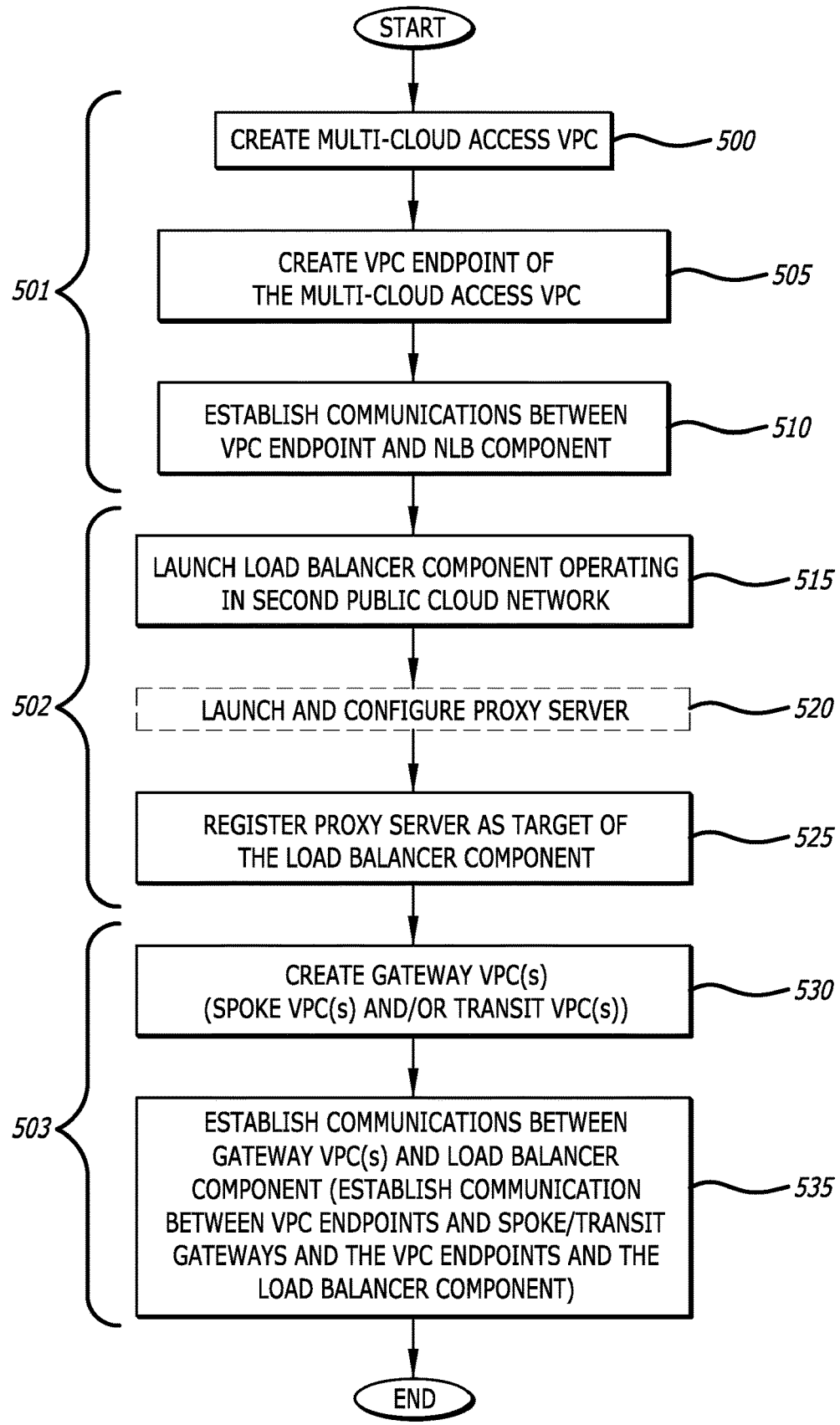
FIG. 5 is an exemplary embodiment of the operations directed to configuration of the multi-cloud overlay network of FIG. 4.

Referring now to FIG. 5, an exemplary embodiment of the operations directed to configuration of the multi-cloud overlay network 100 of FIG. 4 is shown. Herein, according to this embodiment of the disclosure, a second set of workflow operations corresponding to a second orchestration phase of the multi-cloud overlay network 100 is shown. The second set of workflow operations involve an establishment of communications over a control plane of the multi-cloud overlay network 100 (multi-cloud overlay network) between at least the first public cloud network 110 and the second public cloud network 115. The establishment of communications over the control plane of the multi-cloud overlay network 100 for the first public cloud network 110 local to the controller 140 is described in operations 300-360 of FIG. 3.

As a first subset of workflow operations 501, the multi-cloud access VPC 410 is created (operation 500), which further involves creation of the VPC endpoint 412 specific to facilitate cross-cloud communications through the private transport 460 (operation 505). This subset of workflow operations further establishes communications between the VPC endpoint 412 of the multi-cloud access VPC 410 and the NLB component 130 (operation 510).

Thereafter or concurrent with the first subset of workflow operations 502, a second subset of workflow operations 502 is perform to provision and configure the remote load balancing VPC. This provisioning and configuration includes launching a load balancer component operating within the second public cloud network (operation 515). Where the second public cloud network corresponds to a MICROSOFT® AZURE® cloud network, as described below and illustrated as an optional operation, a proxy server is launched and configured (operation 520). The proxy server operates as a backend target for the VPC endpoint of the multi-cloud access VPC, where the proxy server occupies the same VPC as the load balancer component. Thereafter, the proxy server is associated with the load balancer component to register the proxy server as a target for the load balancer component (operation 525).

Now, after the connectivity between the multi-cloud access VPC and the load balancing virtual network has been established, a third subset of workflow operations 503 are conducted to create the gateway VPCs (e.g., spoke gateways and their corresponding endpoint devices) and establish communications with the gateway VPCs associated with the second public cloud network and the load balancer component, which effectively establishes communications between these gateway VPCs and the controller (operation 530 and 535).

According to one embodiment of the disclosure, one or more gateway VPCs are created for communication back to the load balancer component. For example, according to one embodiment of the disclosure, at least one spoke VPC may be created to include one or more spoke gateways and/or at least one transit gateway may be created to include one or more transit gateways (operation 535). After or during creation of the spoke gateway(s) within a corresponding gateway, a VPC endpoint is created and assigned a private IP address to operate as a connection point with the load balancer component (operation 535). As a result, a communication path is created between the spoke gateway(s) of the spoke VPC of the second public cloud network and the controller situated within the first public cloud network via the VPC endpoint of the spoke VPC, the load balancer component, the proxy server, the VPC endpoint of the multi-cloud access VPC, and the NLB component.

Figure 6:
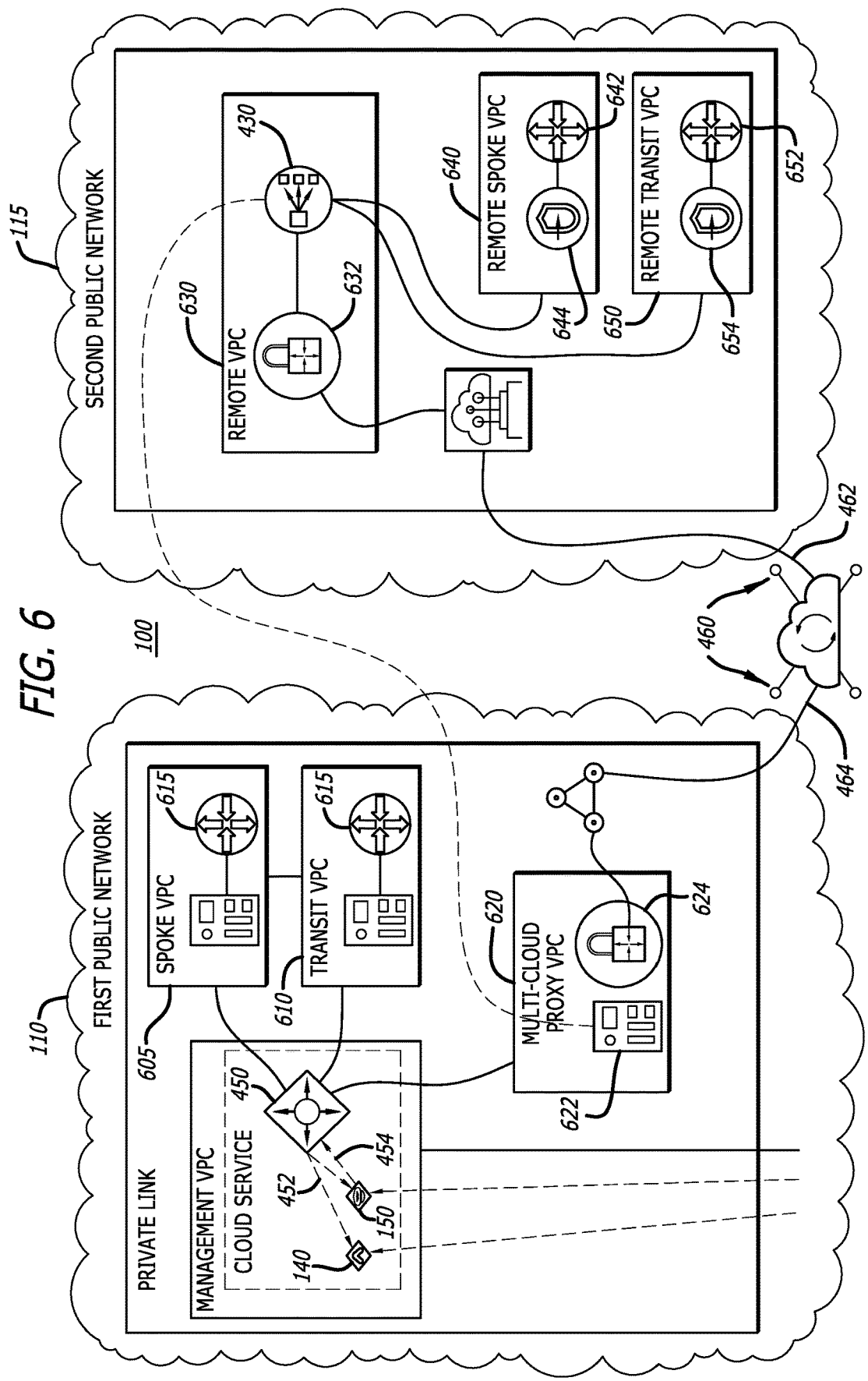
FIG. 6 is an exemplary embodiment of a multi-cloud overlay network corresponding to a software-defined multi-cloud overlay network supporting control plane connectivity over multiple public cloud networks with a controller residing within a first public cloud network of a second public cloud network type.

Referring now to FIG. 6, an exemplary embodiment of the multi-cloud overlay network 100 supporting control plane connectivity over multiple public cloud networks, where the controller residing within a different public cloud network type than illustrated in FIG. 4, is shown. In particular, multi-cloud overlay network 100 overlays the first public cloud network 110 of a second public cloud network type (e.g., operating as MICROSOFT® AZURE® Cloud Services) and the second public cloud network 115 of a first public cloud network type (e.g., operating as AMAZON® WEB SERVICES "AWS").

As shown, for this embodiment, the management VPC 120 is configured to include the load balancer component 450, the controller 140, and the multi-cloud visibility instance 150. Each of these components 450, 140 and 150 is assigned a unique private IP address and the load balancer component 450 is configured so that both instances, namely the multi-cloud controller instance 140 and the multi-cloud visibility instance 150, are registered as targets on different ports 452 and 454 of the load balancer component 450.

Besides the first spoke VPC 600 with one or more spoke gateways 605 and the transit VPC 610 with one or more transit gateways 615, the multi-cloud proxy VPC (VNet) 620 is provided to enable cross-cloud communications through the private transport 460 such as Azure® PrivateLink for example, operating on top of private transmission mediums 464 and 462. As illustrated in FIG. 6, the multi-cloud proxy VPC 620 includes a private endpoint 622 and a VPN gateway 624, where the VPN gateway 624 is communicatively coupled to the second private transmission medium 464 and the private endpoint 622. The private endpoint 622 is communicatively coupled to the load balancer component 450 and a VPN gateway 624.

One subset of workflow operations establishes communications by the private endpoint 622 with both the remote spoke VPC 630 and the load balancer component 450 while another subset of workflow operations establishes communications between the private endpoint 622 and the NLB component 130.

It is contemplated that the second public cloud network 115 features the remote spoke VPC 630 including the VPN gateway 632 and NLB component 130, where no proxy server is needed. Instead, remote spoke VPC 640 and/or the remote transit VPC 650, which form a portion of the multi-cloud overlay network 100, may be communicatively coupled to the NLB component 130. Herein, the remote spoke VPC 640 features one or more spoke gateways 642 and the remote transit VPC 650 features one or more transit gateways 652. Each of the gateway VPCs (e.g., remote spoke VPC 640 and transit VPC 650) include a VPC endpoint 644 and 654, both of which are configured for communicative coupling with the NLB component 130 to allow for private communications between the gateways 642 and/or 652 and components within the management VPC 120 such as the controller 140.

Embodiments of the invention may be embodied in other specific forms without departing from the spirit of the present disclosure. The described embodiments are to be considered in all respects only as illustrative, not restrictive. The scope of the embodiments is, therefore, indicated by the appended claims rather than by the foregoing description. All changes that come within the meaning and range of equivalency of the claims are to be embraced within their scope.

What is claimed is:

1. A multi-cloud overlay network comprising a controller positioned within a first public cloud network, the multi-cloud overlay network configured for supporting communications using private network addresses between virtual networking infrastructures residing in different public cloud networks, comprising:
   a management virtual private cloud network operating within a first public cloud network, the management virtual private cloud network including a network load balancing (NLB) component having a private IP address, wherein the controller is registered as a target on a first port of the NLB component;
   one or more spoke gateways operating within a first public cloud network, the one or more spoke gateways is configured to provide an ingress point and an egress point for network traffic propagated over the multi-cloud overlay network from resources within a first public cloud network; and
   a multi-cloud access virtual private cloud network including an endpoint that is assigned a private IP address and communicatively coupled to the NLB component and a virtual private network (VPN) gateway communicatively coupled to a private transport that establishes a communicative coupling to one or more remote spoke gateways operating in a second public cloud network,
   wherein each of the virtual private cloud networks is associated with a unique private network address range and each cloud component in the virtual private cloud networks is associated with a unique private network address, and
   wherein the multi-cloud overlay network is configured to facilitate two-way communications initiated from one or more of the controller and a spoke gateway of the one or more spoke gateways.

2. The multi-cloud overlay network of claim 1 further comprising:
   a remote cloud load balancer component communicatively coupled between the multi-cloud access virtual private cloud network (VPC) and the one or more remote spoke gateways, the one or more remote spoke gateways provide an ingress point and an egress point for network traffic propagated over the multi-cloud overlay network from resources within the second public cloud network different than the first public cloud network.

3. The multi-cloud overlay network of claim 2, wherein the remote cloud load balancer component is deployed within a remote load balancing virtual public cloud network that is communicatively between the VPN gateway of the multi-cloud access VPC and a virtual network gateway deployed within the remote load balancing virtual public cloud component.

4. The multi-cloud overlay network of claim 1 further comprising:
   one or more transit gateways configured to assist in a routing of a message from the one or more spoke gateways to the one or more remote spoke gateways.

5. The multi-cloud overlay network of claim 1, wherein the controller provisions and manages operability of the one or more spoke gateways and the one or more remote spoke gateways.

6. The multi-cloud overlay network of claim 1, wherein the management virtual private cloud network further comprises a multi-cloud visibility instance registered as a target on a second port of the NLB component, the multi-cloud visibility instance is configured to conduct network health monitoring by at least conducting analytics on the network traffic propagated through the first public cloud network.

7. The multi-cloud overlay network of claim 6, wherein the controller is configured to (i) create a regional load balancer component communicatively coupled to a first spoke gateway of the one or more spoke gateways situated in a first region different than a second region in which the controller resides, (ii) set up a communicative coupling between the regional load balancer component and the management virtual private cloud network, (iii) install the regional load balancer component, and (iv) registers itself and the multi-cloud visibility instance as targets.

8. The multi-cloud overlay network of claim 1, wherein the one or more spoke gateways include at least a first spoke gateway situated within a first region associated with a public cloud network and at least a second spoke gateway is deployed within a second region associated with the public cloud network.

9. The multi-cloud overlay network of claim 7, wherein the second spoke gateway is configured to be communicatively coupled to an endpoint that is communicative coupled to a regional load balancer component, the regional load balancer component is communicatively coupled to the management virtual private cloud network.

10. A method for establishing a control plane being part of a multi-cloud overlay network including a controller positioned within a first public cloud network, the method comprising:
   launching the controller;
   creating a network load balancing (NLB) component assigned a first private network address;
   registering the controller as a target component of the NLB component;

creating a virtual private cloud network including a plurality of networking gateways and an endpoint being assigned a second private network address; and passing connectivity information associated with the NLB component to each of the plurality of networking gateways so that, during launch, each of the plurality of networking gateways is communicatively coupled to the NLB component.

11. The method of claim 10, wherein the plurality of networking gateways includes a plurality of spoke gateways or a plurality of transit gateways.

12. The method of claim 10 further comprising:

establishing communications over a control plane between the first public cloud network and a second public cloud network by at least (i) creating a multi-cloud access virtual private cloud network including an endpoint to be communicatively coupled to the NLB component and assigned a third private network address, (ii) launching a load balancer component operating within the second public cloud network and assigned a fourth private network address, and (iii) establishing communications between the load balancer component and the endpoint of the multi-cloud access virtual private cloud network.

13. The method of claim 12, wherein prior to establishing the communications between the load balancer component and the endpoint of the multi-cloud access virtual private cloud network, the method further comprising:

registering a proxy server as a target to the load balancer component operating within the second public cloud network, the proxy server being assigned a fifth private network address; and creating a virtual private cloud network for a plurality of networking gateways associated with the second public cloud network.

14. The method of claim 13, wherein the establishing of the communications between the load balancer component and the endpoint of the multi-cloud access virtual private cloud network further comprises:

creating an endpoint associated with the plurality of networking gateways residing within the second public cloud network and assigning a sixth private network address to the endpoint; and communicatively coupling the endpoint associated with the plurality of networking gateways to the load balancer component of the second public cloud network.

* * * * *